Patented Feb. 16, 1926.

1,573,490

UNITED STATES PATENT OFFICE.

CARL NELSON HAND, OF NITRO, WEST VIRGINIA, ASSIGNOR TO THE RUBBER SERVICE LABORATORIES CO., OF AKRON, OHIO, A CORPORATION OF OHIO.

INSECTICIDAL COMPOSITION OF MATTER.

No Drawing.   Application filed March 25, 1925. Serial No. 18,313.

*To all whom it may concern:*

Be it known that I, CARL NELSON HAND, a citizen of the United States, residing at Nitro, in the county of Kanawha and State of West Virginia, have invented certain new and useful Improvements in an Insecticidal Composition of Matter, of which the following is a specification.

My present invention relates to an insect destroyer, and more particularly to an insecticidal composition to be used in destroying boll-weevils, potato bugs, and other insects, worms, and insect larvæ, injurious to plant life. The composition may also be effectively used in exterminating and driving away pests infesting the household, such as cock-roaches, ants, bed-bugs, and the like. The value and usefulness of the composition resides not only in that the material is a violent and certain poison to insect pests when ingested even in small quantities by them, but since the composition possesses a bitter and disagreeable taste, when it is scattered or dusted near infested places or on plants upon which they feed, if they escape death they are driven to another feeding ground.

A material or composition, to be used effectively as an insecticide, must first of all be poisonous and fatal to insects when consumed by them in small quantities. However, if used in the house, or on trees or vines such as apples or grapes, the fruit of which might accidentally be eaten without washing, the material must be not at all poisonous, injurious or harmful to human beings or animals. An insecticide, particularly one to be used on growing plants, in the field, should be relatively insoluble in water, so as not to be washed off by every shower, or partially or completely removed by every dew. Moreover, an insecticide should, of course, be harmless to foliage, and must possess the power of adhering tenaciously to the plant and leaves.

The insecticidal composition comprising the subject matter of the present invention, complies with all the conditions set forth above, and will, as I have found, when applied to growing plants, destroy insects and insect larvæ, as well as worm-like pests, such as caterpillars, the army worm and the like. The composition herein described is especially poisonous for use against beetles and the worm-like larvæ of moths, which makes it very efficacious in exterminating the potato bug, boll weevil and other harmful and destructive pests classified by entomologists in this great family of insects.

With the above and other objects in view, the invention will be most readily understood by reference to the following detailed description, and it is to be understood that various changes and modifications, as, for example, variations in the proportions of the ingredients herein named, may be made, and come within the scope of the invention without departing from the spirit thereof, or sacrificing the efficiency of the same, and which come within the scope of the appended claims, in which I intend to claim all novelty permissible in view of the prior art.

Carbon disulfid has been known to be effective for the destruction of some forms of insect life, but its usefulness is very much limited because of its high volatility and the great fire risk involved in its use. Amines and imides, particularly those of the aromatic series of organic compound such as aniline, phthalimidine, as well as corresponding aliphatic compounds, such as succinimide, hexamethylenetetramine, etc., also have certain insecticidal value, and have been experimented with to a certain extent for this purpose. Moreover, substances containing the so-called phenyl group ($C_6H_5$) such as phenol, benzaldehyde, benzylchloride, sodium benzoate, and the like also possess insecticidal properties. I have now found that compounds which may be formed by the union of carbon disulfid and the organic bases or amines, that is, the thio-ureas, as well as other sulfur compounds containing the C=S group, preferably joined to the imino group (=N—H), or the substituted amino (—$NH_2$) group, are very effective in destroying insect life. The best known of the compounds of this type, and the one commercially available in great quantities at the most reasonable price, is symmetrical di-phenyl-thio-urea, more commonly known as thio-carbanilide. It should be noted that this compound contains the =C=S, the =N—H and the ($C_6H_5$) groups in its composition which, as pointed out above, are present separately in a number of insecticidal compounds. When these three groupings are included or combined within a single compound, the characteristic and desirable properties of the various groups are so blended and their effect so pronounced that the compound itself is an ideal insecticide applicable to the destruction of practically every known insect pest.

The thio-ureas and particularly symmetrical diphenyl-thio urea, hereinafter referred to by its more commonly used name, thiocarbanilide, are very destructive to all forms of insect life and may be used in the dry state and in this form may be readily dusted on the foliage of the plant or sifted or scattered about near cracks in the floor or distributed wherever and whenever it is desired. The materials may also, if desired, be applied as a spray wherein the composition is suspended in a carrier liquid as is fully set forth and claimed in my co-pending application, Serial No. 680,265, filed December 12, 1923.

Thiocarbanilide may, then, be applied to a plant or to any place where insect life exists, by sifting the finely ground material from a container, by dusting by means of an air or other gaseous blower or in any other well known manner. Although the material may be used in the comparatively pure state and in the form as ordinarily prepared, it is not usually necessary to apply it in such a concentrated form and for this reason it is generally desirable to mix with the material comparatively large quantities of other substances to serve primarily as a solid diluent or filler of the active agent and also to prevent any tendency that the materials may have to cake or pack together. Thus, I may mix with the thio-urea an equal volume, or even a greater amount, for example, three or four or more volumes, of such materials as starch, flour, magnesium oxide, clay and the like. It is also possible, and sometimes desirable to thoroughly incorporate into the mixture a small quantity, for example about 2 to 5% by weight of plaster of Paris. This material, as is well known, hardens or sets when wet, and the presence of such a substance in my composition, particularly when the diluents are present in a predominating amount, will aid the composition in clinging to the leaves of the plant.

It is also possible to mix with my preferred class of insecticidal compositions, certain substances which of themselves have some value and use as insecticides, such as lime, sulfur, sodium fluoride, pyrethrum flowers, tobacco powder, naphthalene, borax, copper sulfate, copper carbonate, and the like. Although for most purposes I prefer to employ a thio-urea either by itself or in admixture with inert diluents or with non-poisonous insecticidal or fungicidal compounds, yet it is possible that under certain conditions, it might be desirable to add my preferred composition in any desired or necessary proportion to the older types of insecticides such as hellebore, Paris green, lead or calcium arsenate and the like. In fact, the addition of my preferred type of compounds, in quantities approximating 15–20% by weight of the mixture, will enhance the insecticidal value and repellent nature of any of the well known insecticides.

A composition intended particularly for dusting potato vines comprises, for example, 5 pounds of copper carbonate, 15 pounds of thio-carbanilide, and 80 pounds of sulfur. Another composition for use on fruit trees, particularly the apple, comprises 15 pounds of thiocarbanilide and 85 pounds of sulfur. A composition for dusting poultry and other birds and animals comprises 20 pounds of thio-carbanilide and 80 parts of clay, magnesium oxide, zinc oxide and the like or it is possible to use thio-carbanilide alone or admixed with sulfur or with sulfur and hellebore for this purpose. A composition for use in the household as a remedy against cock-roaches, ants, etc., comprises 25 pounds of thiocarbanilide and 75 parts of starch or other filler, with or without a small quantity of a sweetening agent or other insecticide, if desired.

It is to be understood that by use of the word, "insect", I do not limit the use of my material to the destruction of the adult insect only, but that I intend the word to include broadly all forms of insect life, and particularly the larvæ of insects, and similar worm-like pests. It is also to be understood that the examples I have given are illustrative only, and not to be considered as limitative of my invention, or as restricting me to the proportions of ingredients as given. Broadly my invention comprises the use of thio carbanilide or other like compounds and which may be produced for example by the interaction of carbon disulfid with aromatic amines. Such compounds may be used by themselves if desired, or may be admixed with inert filling materials or with other substances having insecticidal or fungicidal value of their own.

What I claim is:—

1. A dusting composition for use in destroying insect life, which comprises a thio-urea.

2. A dusting composition for use in destroying insect life, which comprises a thio-urea, and an inert, substantially water insoluble, solid material.

3. A dusting composition for use in destroying insect life, which comprises a thio-urea admixed with sulfur.

4. A dusting composition for use in destroying insect life which comprises thio-carbanilide admixed with sulfur.

5. A dusting composition for use in destroying insect life which comprises a mixture of approximately fifteen parts of thio-carbanilide, admixed with approximately eighty-five parts of sulfur.

6. The process of destroying insect life which comprises applying a finely ground thio-urea to a plant.

7. The process of destroying insect life which comprises applying a mixture of a thio-urea and an inert substantially water insoluble solid material to a plant.

8. The process of destroying insect life which comprises applying a mixture of a thio-urea and sulfur to a plant.

9. The process of destroying insect life which comprises applying a mixture of thio carbanilide and sulfur to a plant.

10. The process of destroying insect life which comprises applying a mixture of approximately fifteen parts of thio carbanilide and eighty-five parts of sulfur to a plant.

11. The process of destroying insect life which comprises applying a dust of finely ground thio carbanilide to a plant by means of a gaseous vehicle.

CARL NELSON HAND.